(12) United States Patent
Venkatesan et al.

(10) Patent No.: US 12,395,331 B2
(45) Date of Patent: Aug. 19, 2025

(54) DECRYPTION KEY GENERATION AND RECOVERY

(71) Applicant: Microsoft Technology Licensing, LLC, Redmond, WA (US)

(72) Inventors: Ramarathnam Venkatesan, Redmond, WA (US); Nishanth Chandran, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 231 days.

(21) Appl. No.: 17/931,733

(22) Filed: Sep. 13, 2022

(65) Prior Publication Data

US 2024/0089098 A1     Mar. 14, 2024

(51) Int. Cl.
H04L 9/08     (2006.01)

(52) U.S. Cl.
CPC .......... *H04L 9/0894* (2013.01); *H04L 9/0825* (2013.01); *H04L 9/085* (2013.01)

(58) Field of Classification Search
CPC ... H04L 9/0861; H04L 9/0894; H04L 9/0825; H04L 9/085; H04L 9/3218; H04L 9/0822
See application file for complete search history.

(56) References Cited

U.S. PATENT DOCUMENTS

| | | | |
|---|---|---|---|
| 8,601,549 B2 | 12/2013 | Dickerson | |
| 9,547,771 B2 * | 1/2017 | Roth | H04L 9/088 |
| 10,211,977 B1 * | 2/2019 | Roth | H04L 9/3234 |
| 10,637,855 B2 * | 4/2020 | Mikulski | H04L 63/0884 |
| 10,990,689 B1 | 4/2021 | Reiner | |
| 11,036,869 B2 * | 6/2021 | Roth | G06F 21/602 |
| 11,139,954 B2 * | 10/2021 | Mercuri | G06F 21/602 |

(Continued)

FOREIGN PATENT DOCUMENTS

| | | |
|---|---|---|
| CN | 110363528 A | 10/2019 |
| CN | 114221764 A | 3/2022 |
| JP | 2022020557 A | 2/2022 |

OTHER PUBLICATIONS

Alansari., "A Blockchain-Based Approach for Secure, Transparent and Accountable Personal Data Sharing", A thesis submitted in partial fulfillment for the degree of Doctor of Philosophy, Aug. 2, 2020, 213 pages.

(Continued)

*Primary Examiner* — Hosuk Song
(74) *Attorney, Agent, or Firm* — Weaver IP L.L.C.

(57) ABSTRACT

A decryption key is recovered that is utilized to decrypt an encrypted resource. One or more location attribute policy (LAP) servers determine whether a user attempting to access a resource has the necessary attributes to access the resource and is in a valid location in which the user is required to be to access the resource. The attributes and location are defined by a policy assigned to the resource. To verify that the user has the required attributes, the LAP server(s) request a cryptographic proof from the user that proves that the user has the required attributes. Upon validating the proof, a first portion of the decryption key is released. The LAP server(s) release a second portion of the decryption key after verifying that the user is in the required location. The LAP server(s) generate the decryption key based on the released portions.

20 Claims, 5 Drawing Sheets

(56) References Cited

U.S. PATENT DOCUMENTS

| | | | |
|---|---|---|---|
| 11,424,920 B2* | 8/2022 | Bursell | ............... H04L 9/0861 |
| 11,544,409 B2 | 1/2023 | Brannon | |
| 11,593,316 B2 | 2/2023 | Haldar | |
| 11,695,555 B2* | 7/2023 | Roth | ............ H04L 9/14 |
| | | | 713/176 |
| 11,799,630 B2 | 10/2023 | Zhang | |
| 11,886,574 B2* | 1/2024 | Bursell | ............ G06F 21/6218 |
| 12,058,265 B2* | 8/2024 | Khoury | ............... H04L 63/123 |
| 12,107,900 B2 | 10/2024 | Gargaro | |
| 2002/0023213 A1 | 2/2002 | Walker | |
| 2002/0138738 A1 | 9/2002 | Sames | |
| 2007/0055867 A1 | 3/2007 | Kanungo et al. | |
| 2012/0060207 A1 | 3/2012 | Mardikar et al. | |
| 2013/0145151 A1 | 6/2013 | Brown | |
| 2015/0089575 A1 | 3/2015 | Vepa | |
| 2015/0288669 A1 | 10/2015 | Litoiu | |
| 2015/0381575 A1 | 12/2015 | Bhargav-spantzel et al. | |
| 2017/0041148 A1 | 2/2017 | Pearce | |
| 2017/0111175 A1 | 4/2017 | Oberhauser et al. | |
| 2019/0020485 A1 | 1/2019 | Uhr | |
| 2019/0163912 A1 | 5/2019 | Kumar | |
| 2019/0258811 A1 | 8/2019 | Ferraiolo | |
| 2019/0370358 A1 | 12/2019 | Nation | |
| 2019/0394175 A1 | 12/2019 | Zhang | |
| 2020/0014537 A1 | 1/2020 | Ortiz | |
| 2020/0082401 A1 | 3/2020 | Arora | |
| 2020/0322342 A1 | 10/2020 | Gokhale | |
| 2020/0374105 A1 | 11/2020 | Padmanabhan | |
| 2020/0396222 A1 | 12/2020 | Gargaro et al. | |
| 2020/0404023 A1 | 12/2020 | Zhu | |
| 2021/0089676 A1 | 3/2021 | Ford | |
| 2021/0092607 A1 | 3/2021 | Klinkner | |
| 2021/0218742 A1 | 7/2021 | Cook | |
| 2021/0232707 A1 | 7/2021 | Wilson | |
| 2021/0233673 A1 | 7/2021 | Zhang | |
| 2021/0273931 A1 | 9/2021 | Murdoch et al. | |
| 2021/0279355 A1 | 9/2021 | Otte | |
| 2021/0303714 A1 | 9/2021 | Yaghoobi | |
| 2021/0367778 A1 | 11/2021 | Hamel | |
| 2021/0377037 A1 | 12/2021 | Antonopoulos et al. | |
| 2022/0020003 A1 | 1/2022 | Sarkar | |
| 2022/0021711 A1 | 1/2022 | Marsh | |
| 2022/0138181 A1 | 5/2022 | Irazabal | |
| 2022/0188810 A1 | 6/2022 | Doney | |
| 2022/0269927 A1 | 8/2022 | Rice | |
| 2022/0271936 A1 | 8/2022 | Doney | |
| 2022/0292211 A1 | 9/2022 | Reineke | |
| 2022/0400020 A1 | 12/2022 | Davies | |
| 2022/0417254 A1 | 12/2022 | Michaelis | |
| 2023/0015569 A1 | 1/2023 | Davies | |
| 2023/0035317 A1 | 2/2023 | Jufer | |
| 2023/0336547 A1 | 10/2023 | Damour | |
| 2023/0379699 A1 | 11/2023 | Oerton | |
| 2023/0388348 A1 | 11/2023 | Authement | |
| 2024/0056424 A1 | 2/2024 | Venkatesan | |
| 2024/0104229 A1 | 3/2024 | Venkatesan | |
| 2024/0114012 A1 | 4/2024 | Venkatesan | |
| 2024/0119168 A1 | 4/2024 | Venkatesan | |
| 2024/0121081 A1 | 4/2024 | Venkatesan | |

OTHER PUBLICATIONS

International Search Report and Written Opinion received for PCT Application No. PCT/US2023/031022, mailed on Dec. 11, 2023, 16 pages.

Mounnan, et al., "Efficient Distributed Access Control Using Blockchain for Big Data in Clouds", International Conference on Wireless and Mobile Communications (ICWMC), Jun. 30, 2019, pp. 53-62.

"Application as Filed in U.S. Appl. No. 17/819,030", Filed Date: Aug. 11, 2022, 57 Pages.

Antonopoulos, et al., "SQL Ledger: Cryptographically Verifiable Data in Azure SQL Database", In Proceedings of the International Conference on Management of Data, Jun. 20, 2021, pp. 2437-2449.

"International Search Report and Written Opinion Issued in PCT Application No. PCT/US23/027303", Mailed Date: Oct. 13, 2023, 12 Pages.

"International Search Report and Written Opinion Issued in PCT Application No. PCT/US23/030412", Mailed Date: Oct. 18, 2023, 12 Pages.

Singh, et al., "Security for Online Transaction Based on User Location", In Journal of International Journal For Innovative Research In Multidisciplinary Field, vol. 3, Issue 4, Apr. 1, 2017, pp. 60-64.

Yue, et al., "GlassDB: An Efficient Verifiable Ledger Database System Through Transparency", In repository of arXiv:2207.00944v2, Aug. 8, 2022, 14 Pages.

Non-Final Office Action mailed on Sep. 6, 2024, in U.S. Appl. No. 17/937,098, 18 pages.

Non-Final Office Action mailed on Oct. 18, 2024, in U.S. Appl. No. 17/934,730, 25 pages.

Notice of Allowance mailed on Mar. 14, 2025, in U.S. Appl. No. 17/937,098, 12 pages.

International Preliminary Report on Patentability received for PCT Application No. PCT/US23/030412, Mar. 27, 2025, 08 Pages.

Final Office Action mailed on Apr. 24, 2025, in U.S. Appl. No. 17/934,730, 27 pages.

International Preliminary Report On Patentability received for PCT Application No. PCT/US23/030988, Apr. 3, 2025, 08 pages.

International Preliminary Report on Patentability received for PCT Application No. PCT/US23/031022, mailed on Apr. 10, 2025, 09 pages.

International Search Report and Written Opinion received for PCT Application No. PCT/US23/030988, mailed on Nov. 30, 2023, 13 pages.

Jaroucheh, et al., "Secretation: Toward a Decentralised Identity and Verifiable Credentials Based Scalable and Decentralised Secret Management Solution", IEEE International Conference on Blockchain and Cryptocurrency, 20201, 09 Pages.

Notice of Allowance mailed on May 19, 2025, in U.S. Appl. No. 17/937,098 12 pages.

Notice of Allowance mailed on May 20, 2025, in U.S. Appl. No. 17/938,711, 10 pages.

Notice of Allowance mailed on May 29, 2025, in U.S. Appl. No. 17/819,030, 06 pages.

\* cited by examiner

DECRYPTION KEY GENERATION AND RECOVERY

BACKGROUND

Public-key cryptography (also known as asymmetric cryptography) is a cryptographic system that uses pairs of keys. Each pair consists of a public key (which is known to others) and a private key (which is only known to the owner). Effective security requires keeping the private key private, whereas the public key can be openly distributed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In aspects disclosed herein, a decryption key is recovered that is utilized to decrypt an encrypted resource. One or more location attribute policy servers determine whether a user attempting to access an encrypted resource has the necessary attributes to access the resource and is in a valid location in which the user is required to be to access the resource. The attributes and location are defined by a policy assigned to the resource. To verify that the user has the required attributes, the location attribute policy server(s) request a cryptographic proof from the user that proves that the user has the required attributes. Upon validating the cryptographic proof, a first portion of the decryption key is released. The location attribute policy server(s) release a second portion of the decryption key after verifying that the user is in the required location. The location attribute policy server(s) generate the decryption key based on the first and second portions.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Public-key cryptography (also known as asymmetric cryptography) is a cryptographic system that uses pairs of keys. Each pair consists of a public key (which is known to others) and a private key (which is only known to the owner). Effective security requires keeping the private key private, whereas the public key can be openly distributed.

One potential security vulnerability arises when access policies for accessing encrypted resources are enforced by trusted components of an organization (e.g., components of a particular organization or network that are assumed to be secure) that maintain the resources. If a malicious entity manages to infiltrate such resources, the malicious entity is free to move laterally and access or exfiltrate sensitive data.

Embodiments are described herein are directed to recovering a decryption key utilized to decrypt an encrypted resource. For example, one or more location attribute policy servers are configured to determine whether a user attempting to access an encrypted resource has the necessary attributes to access the resource and is in a valid location in which the user is required to be to access the resource. The attributes and location are defined by a policy assigned to the resource. To verify that the user has the required attributes, the location attribute policy server(s) request a cryptographic proof from the user that proves that the user has the required attributes. Upon validating the cryptographic proof, a first portion of the decryption key is released. The location attribute policy server(s) release a second portion of the decryption key after verifying that the user is in the required location. The location attribute policy server(s) generate the decryption key based on the first and second portions.

The techniques described herein provide cryptographic enforcement, in a zero-trust model (and other models), end-to-end across various types of data, services, and organizations. In particular, one or more components of the LAP server(s) (e.g., the component(s) that perform proof verification, location verification and/or key recovery) may not be considered as "trusted." Such untrusted components are not entrusted to store sensitive data, such as decryption keys, due to a risk of the sensitive data being compromised thereon. Instead, such component(s) simply maintain the necessary information to release such keys.

Accordingly, the techniques described herein advantageously provide improvements in other technologies, namely data encryption, security, and privacy. For instance, by utilizing a zero-trust model, access to sensitive data, such as decryption keys, is prevented. By doing so, the techniques described herein also prevent access to a user's network and computing entities (e.g., computing devices, virtual machines, etc.). By mitigating the access to such computing entities, the unnecessary expenditure of compute resources (e.g., central processing units (CPUs), storage devices, memory, power, etc.) associated with such entities is also mitigated. Accordingly, the embodiments described herein also improve the functioning of the computing entity on which such compute resources are utilized/maintained, as such compute resources are conserved as a result from preventing a malicious entity from utilizing such compute resources, e.g., for nefarious purposes.

Figure 1:
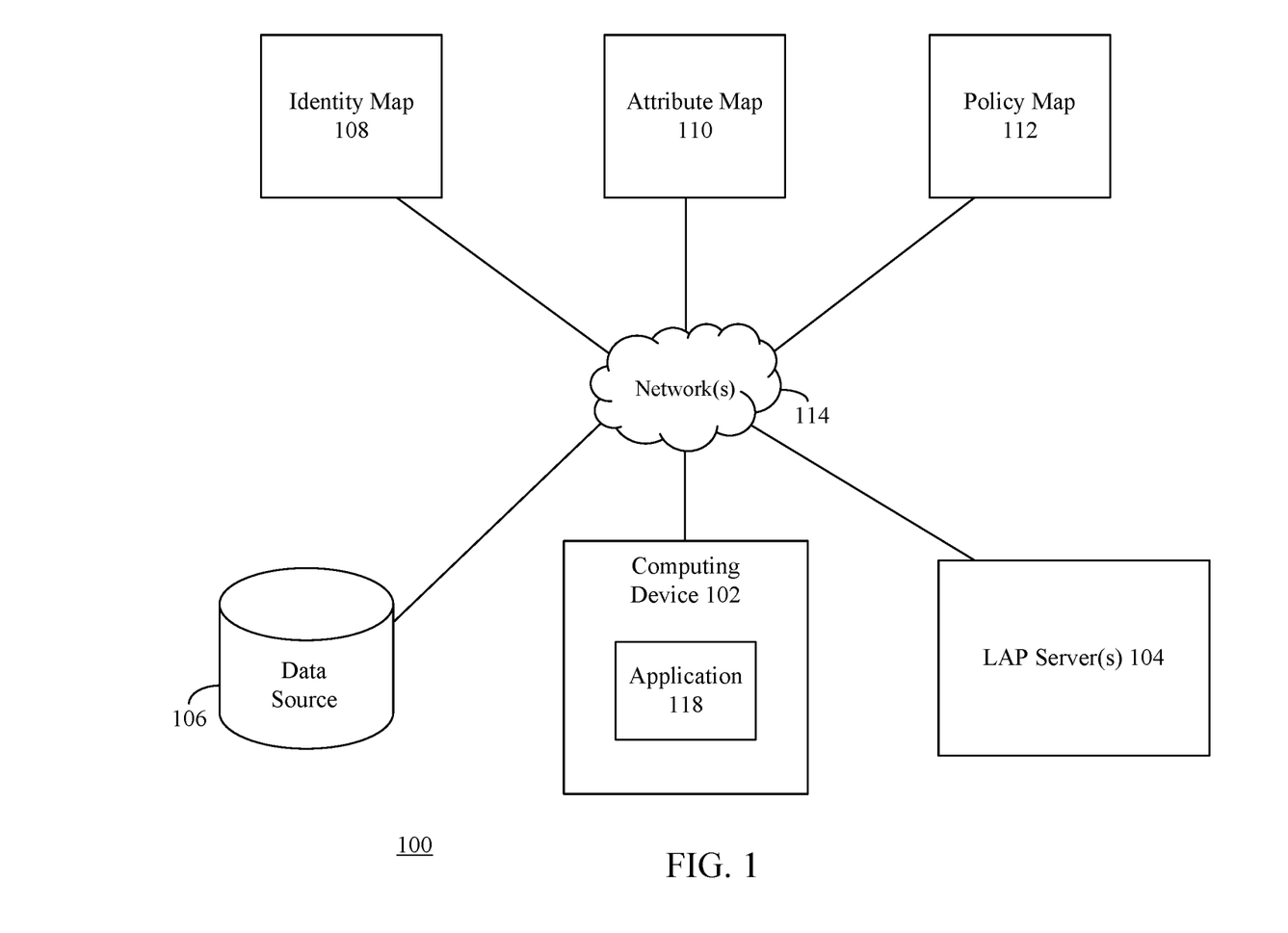
FIG. 1 shows a block diagram of an example system for recovering a decryption key in accordance with an embodiment.

FIG. 1 shows a block diagram of an example system 100 for recovering a decryption key, according to an example embodiment. As shown in FIG. 1, system 100 includes a computing device 102, one or more location attribute policy (LAP) server(s) 104, a data source 106, an identity map 108, an attribute map 110, and a policy map 112. In embodiments, computing device 102, LAP server(s) 104, data source 106, identity map 108, attribute map 110, and/or policy map 112 are communicatively coupled via one or more networks, comprising one or more of local area networks (LANs), wide area networks (WANs), enterprise networks, the Internet, etc., and includes one or more of wired and/or wireless portions. Computing device 102 is any type of processing device, including, but not limited to, a desktop computer, a server, a mobile or handheld device (e.g., a tablet, a personal data assistant (PDA), a smart phone, a laptop, etc.), an Internet-of-Things (IoT) device, etc. LAP server(s) 104 comprise one or more server computers or computing devices, which include one or more distributed or "cloud-based" servers, in embodiments. In embodiments, LAP server(s) 104 are associated with, or are a part of, a cloud-based service platform and in some embodiments, LAP server(s) 104 comprise an on-premises server(s) in addition to, or in lieu of, cloud-based servers.

Identity map 108 is configured to store an identity for each of a plurality of users (e.g., members, employees, etc.), for example, of an organization. Each identity comprises information that uniquely identifies the user within the organization. Examples of the identity include, but are not limited to, the user's email address, the user's phone number, the user's username, or any other type of information that uniquely identifies the user. Identity map 108 is also configured to store, for each user, a public signing key of the user in association with the identity of the user, and/or a public encryption key of the user in association with the identity of the user.

Attribute map 110 is configured to store one or more attributes for each of a plurality of users of the organization. Each of the attribute(s) for a particular user are stored in association with the identity of that user. Examples of attribute(s) include, but are not limited to, a security clearance level of the user (e.g., confidential, secret, top secret, top secret, top secret special access etc.), a rank (e.g., lieutenant, captain, major, colonel, etc.) of the user within an organization (e.g., such as a military organization), a role of the user within an organization (e.g., a field agent, an analyst, a manager, a director, a chief technology officer, a chief executive officer, etc.), etc. Attribute map 110 is also configured to store, for each user, one or more encrypted shared secrets (e.g., one or more pieces of data, such as a password, a private key, a public key, a string of characters and/or random numbers, etc. that are encoded in accordance with an encryption technique, such as, but not limited to, a secure hash algorithm (SHA)-based technique). Each of the shared secret(s) for a particular user are stored in association with the identity of that user. Attribute map 110 also associates each encrypted shared secret with a corresponding attribute of the attributes stored in attribute map 110. As described below, the encrypted shared secret(s) are utilized to verify whether a user is actually associated with corresponding attributes. In accordance with an embodiment, the shared secret(s) of a user stored in attribute map 110 are encrypted with a private encryption key of that user. Attribute map 110 is also configured to store, for each attribute, a public encryption key, which, as will be described below, is utilized to generate cryptographic proofs. Attribute map 110 associates each public encryption key with a corresponding attribute and corresponding encrypted secret share of the attributes and encrypted secret shares stored in attribute map 110.

Policy map 112 is configured to store one or more policies for resources (e.g., accessible pieces of data on which one or more operations can be performed) maintained by data source 106. Each of the polic(ies) specify one or more conditions that are required to be satisfied for a user to perform a certain action with respect to a corresponding resource. Policy map 112 associates each of the polic(ies) with a policy identifier (ID), which uniquely identifies a corresponding policy. Such actions include, but are not limited to, accessing a resource (e.g., reading or writing to a resource), sending the resource to another user, sending a communication to another user, etc.). The conditions include, but are not limited to, an identity of a user authorized to perform the action, particular attributes that the identity (or user) is required to have to perform the action, a location at which the user (and/or a computing device associated therewith) is required to be to perform the action, and/or the like. Examples of resources include, but are not limited to, a data file (e.g., a document), a database object (e.g., a table, a directory, etc.), structured data, unstructured data, semi-structured data, a data container, etc. Examples of locations include, but are not limited to, a particular room or building, a particular vehicle or vessel (e.g., a particular car, a particular submarine, a particular aircraft carrier, etc.), a particular city, a particular country, etc.

In accordance with one or more embodiments, each of identity map 108, attribute map 110, and policy map 112 are maintained in a respective table of a database. For example, with respect to identity map 108, a first column of identity map 108 stores user identities, a second column stores public signing keys, a third column stores public encryption keys, etc. With respect to attribute map 110, a first column of attribute map 110 stores user identities, a second column stores first attributes, a third column stores second attributes, a fourth column stores first encrypted shared secrets associated with the first attributes, a fifth column stores second encrypted shared secrets associated with the second attributes, a sixth column stores a first public encryption key associated with the first attributes and/or first encrypted shared secrets, a seventh column stores a second public encryption key associated with the second attributes and/or second encrypted shared secrets, etc. With respect to policy map 112, a first column stores policy IDs, a second column stores the policies, etc.

In accordance with one or more embodiments, one or more columns of identity map 108, attribute map 110, and/or policy map 112 are maintained together in a single table of a database. An example of a database via which identity map 108, attribute map 110, and/or policy map 112 are maintained includes, but is not limited to, Azure SQL Database™ from Microsoft® Corporation of Redmond, Washington.

As also shown in FIG. 1, computing device 102 comprises an application 118. Application 118 is any software application that is utilized to access a resource, encrypt a resource, and/or decrypt a resource. Examples of application 118, but are not limited to, a messaging application (e.g., Microsoft Teams™ published by Microsoft Corporation of Redmond, WA), a word processing application (e.g., Microsoft Word™ published by Microsoft Corporation), a database application, etc.

Application 118 is configured to access a resource, for example, maintained by data source 106. Data source 106 also comprises a policy ID specified for each resource maintained thereby. In accordance with an embodiment, the policy ID is stored as metadata associated with the resource. Examples of data source 106 include, but are not limited to, a data store, a file repository, a database, etc. The resource may be encrypted (e.g., the resource is encoded in accordance with an encryption technique, such as, but not limited to, a secure hash algorithm (SHA)-based technique). In such a case, application 118 requires the resource to be decrypted (e.g., decoded in accordance with an decryption technique, such as, but not limited to, a secure hash algorithm (SHA)-based technique), for example, using a decryption key, in order to access it. The resource is decrypted if a policy (e.g., an access policy) associated with the resource is satisfied.

LAP server(s) 104 are configured to determine whether the policy for a resource attempted to be accessed by application 118 is satisfied. For example, LAP server(s) 104 determine whether the user has the necessary attributes and is at a location specified by the policy. Upon determining that the policy is satisfied, LAP server(s) 104 recover the decryption key. In accordance with an embodiment, LAP server(s) 104 provide the decryption key to application 118, application 118 decrypts the resource using the decryption key, and application 118 accesses the decrypted resource. In accordance with another embodiment, LAP server(s) 104 decrypt the resource using the recovered decryption key and provides the decrypted resource to application 118.

In accordance with an embodiment, the location is verified by a LAP server of LAP server(s) 104 that is located at the location. For instance, if the location specified by the policy is an aircraft carrier, then the LAP server that performs the location verification is located on the aircraft carrier. Although, it is noted that the embodiments described herein are not so limited and that any LAP server of LAP server(s) 104 designated to perform the location verification (either located locally or remotely from the specified location) performs the location verification.

Figure 2:
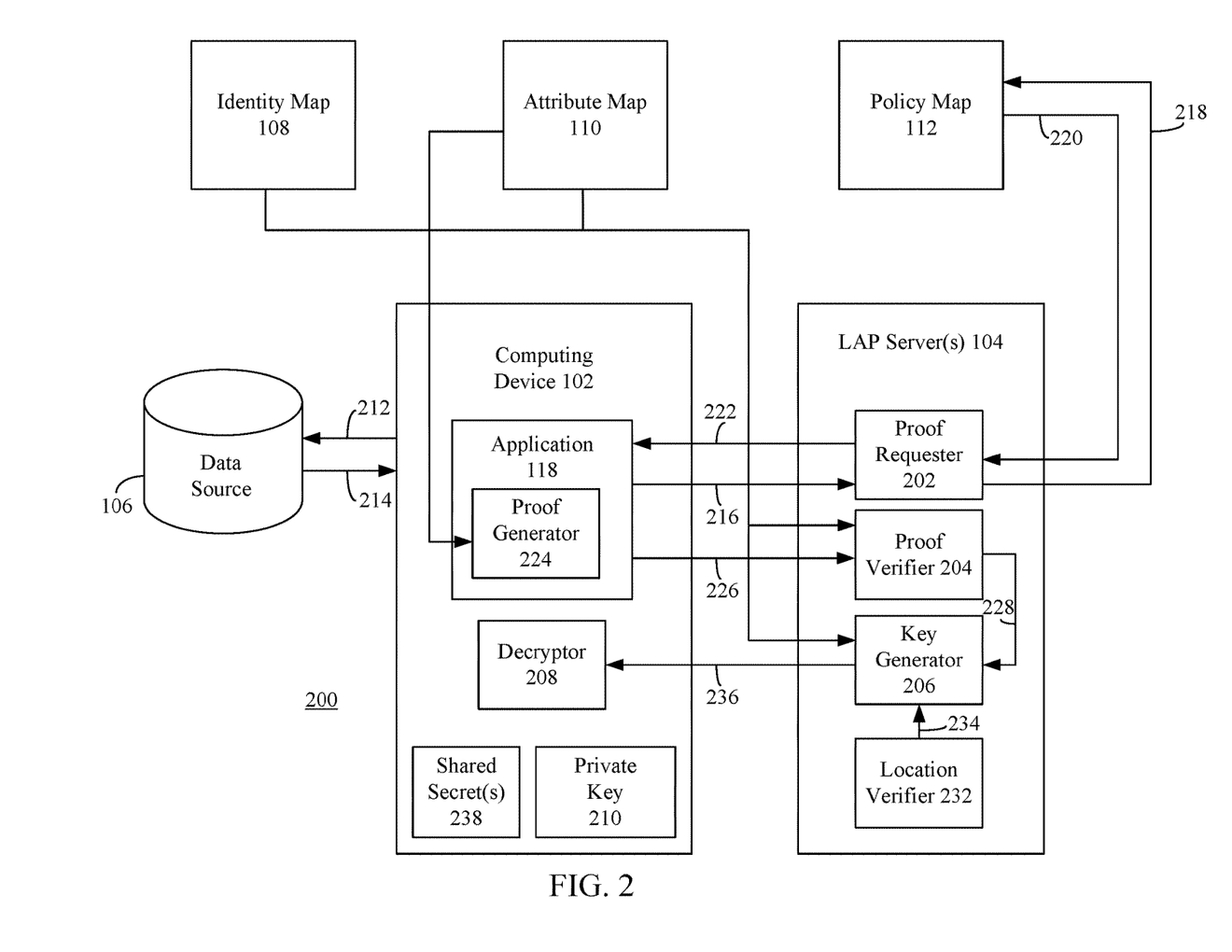
FIG. 2 shows a block diagram of an example system for recovering a decryption key in accordance with another embodiment.

FIG. 2 depicts a block diagram of a system 200 for recovering a decryption key in accordance with another embodiment. As shown in FIG. 2, system 200 includes computing device 102, LAP server(s) 104, data source 106, identity map 108, attribute map 110, and policy map 112. As further shown in FIG. 2, LAP server(s) 104 comprise a proof requester 202, a proof verifier 204, a key generator 206, and a location verifier 1132. Computing device 102 comprises application 118, a decryptor 208, and a private encryption key 210. In accordance with an embodiment, each of proof requester 202, proof verifier 204, key generator 206, and location verifier 232 are included in a single LAP server of LAP server(s) 104. In accordance with another embodiment, one or more of proof requester 202, proof verifier 204, key generator 206, and/or location verifier 1132 are included in a respective LAP server of LAP server(s) 104.

To request a resource, application 118 provides a request 212 identifying the resource to data source 106. Data source 106 is configured to return a response 214 including the encrypted resource and/or specifying at least the policy ID that identifies the policy associated with the requested resource and/or an organization that specifies and/or maintains the policy.

Application 118 provides the policy ID to a LAP server of LAP server(s) 104 via a request 216. In accordance with an embodiment, application 118 also provides information that indicates a location at which computing device 102 is located via a request (e.g., request 216). The information includes, for example, Global Positioning System (GPS) coordinates, an Internet Protocol (IP) address, etc. In accordance with an embodiment, various organizations maintain respective LAP server(s), each configured to determine a policy for resources associated therewith. In accordance with an embodiment, the organization identified via response 214 is a uniform resource identifier (URI) (e.g., a uniform resource locator (URL)), or an identifier utilized to lookup the URI, at which LAP server(s) of the organization and/or an identity map, attribute map, and/or policy map associated with the organization are located. In accordance with such an embodiment, request 216 is provided to the LAP server(s) corresponding to the URI thereof.

Proof requester 202 of LAP server(s) 104 is configured to provide a request 218 to policy map 112 associated with the organization that specifies the policy ID. Policy map 112 looks up the policy associated with policy ID and returns the policy to proof requester 202 via a response 220. Proof requester 202 analyzes the policy to determine the attribute(s) that are required to access the resource requested by application 118. For instance, the policy specifies an identity at the organization that is allowed to access the resource, specifies that the user requires a first attribute (e.g., the user is required to have a rank level of captain), a second attribute (the user is required to have a top secret security clearance level, and/or location information that specifies that the user must be in a particular location (e.g., aboard a particular submarine) to access the resource.

After determining the attribute(s), proof requester 202 is configured to determine whether the user has the proper identity and/or attributes. For instance, proof requester 202 requests application 118 to prove that the user has the proper identity and/or attributes. To prove the user's identity, proof requester 202 generates a nonce (e.g., a randomly-generated number intended to prevent replay attacks) and encrypts the nonce using the public encryption key of the user, which proof requester 202 retrieves from identity map 108 associated with the organization. Proof requester 202 also maintains a copy of the nonce. Proof requester 202 provides the encrypted nonce to application 118 via a request 222.

Decryptor 208 is configured to decrypt the nonce using private encryption key 210 and provides the decrypted nonce to proof verifier 204 via a response 226. In accordance with an embodiment, decryptor 208 is a separate component (e.g., a software application, a hardware-based cryptoprocessor, etc.) from application 118 (as shown in FIG. 1). In accordance with another embodiment, decryptor 208 is incorporated in application 118. Private encryption key 210 is stored locally in a secure environment of computing device 102. Examples of a secure environment include, but are not limited to, a trusted platform module (TPM), a hardware security module (HSM), or any type of secure hardware and/or software-based cryptoprocessor.

Proof verifier 204 is configured to compare the decrypted nonce to the locally-stored nonce. If the nonces match, then proof verifier 204 determines that the user has the proper identity. Otherwise, proof verifier 204 determines that the user does not have the proper identity and access to the encrypted resource is denied.

To prove that the user has the proper attributes, proof requester 204 requests application 118 to provide a zero-knowledge cryptographic proof that the user has the proper attributes via a request (e.g., request 222). In accordance with the zero-knowledge cryptographic proof, the user (or application thereof (e.g., application 118)) proves to proof verifier 204 that the user has the proper attributes while the user avoids conveying any additional information apart from the fact that the user has the proper attributes. In accordance with an embodiment, the request is the same request in which the encrypted nonce is provided (e.g., request 222). In accordance with another embodiment, the request is a different request in which the encrypted nonce is provided.

The request is received by a proof generator 224 associated with application 118. In accordance with an embodiment, proof generator 224 is incorporated in application 118 (as shown in FIG. 2). In accordance with another embodiment, proof generator 224 is a separate component (e.g., a software application, a hardware-based proof generator, etc.) from application 118. Proof generator 224 is configured to generate a zero-knowledge cryptographic proof based on public encryption key(s) respectively associated with the attribute(s) specified by the policy and an unencrypted version of shared secrets (shown as shared secret(s) 238) respectively associated with the first and second attributes. As shown in FIG. 2, shared secret(s) 238 are stored locally at computing device 102. As described above, an encrypted version of shared secret(s) 238 associated with the user and the public encryption key associated with the attributes are stored in attribute map 110. Accordingly, proof generator 224 retrieves the public encryption key associated with the attributes from attribute map 110. In accordance with an embodiment, proof generator 224 generates the cryptographic proof based on a zero-knowledge protocol, such as, but not limited to, Schnorr's protocol. Proof generator 224 provides the cryptographic proof to proof verifier 204 of LAP server(s) 104 via a response (e.g., response 226).

Responsive to receiving the request, proof verifier 204 retrieves the public encryption key(s) associated with the attribute(s) specified by the policy from attribute map 110 and retrieves the encrypted secret share(s) of the user that are associated with the attribute(s) specified by the policy from attribute map 110. Proof verifier 204 then verifies the cryptographic proof received via the response (e.g., response 226) based on the public encryption key(s) associated with the attribute(s) specified by the policy and the encrypted secret share(s) retrieved from attribute map 110. In accordance with an embodiment, proof verifier 204 verifies the cryptographic proof based on a zero-knowledge protocol, such as, but not limited to, Schnorr's protocol. In response to determining that the cryptographic proof is valid, proof verifier 204 provides (or releases) a first portion 228 of the decryption key to key generator 206. In accordance with an embodiment, first portion 228 is a first set of randomly-generated numbers. In response to determining that the cryptographic proof is not valid, proof verifier 204 does not provide the first portion of the decryption key and access to the resource is denied.

In accordance with an embodiment, the LAP server on which proof verifier 204 executes is configured to store first portion 228. For instance, when an entity encrypts the resource, the entity configures the LAP server to store first portion 228 and specifies the conditions (e.g., the necessary attributes) required to release first portion 228.

In accordance with an embodiment, location verifier 232 compares the location information provided by application 118 to the location information specified by the policy. If the location information matches, location verifier 232 determines that the user is at a location at which access to the resource is allowed in accordance with the policy and provides (or releases) a second portion 234 of the decryption key to key generator 206. In accordance with an embodiment, second portion 234 is a second set of randomly-generated numbers.

In an embodiment in which LAP server(s) 104 are located in the same location (e.g., an aircraft carrier), location verifier 232 is configured to automatically release second portion 234 responsive to proof verifier 204 verifying that the cryptographic proof provided by proof generator 224 is valid.

Location verifier 232 provides second portion 234 to prevent collusion between multiple parties when a policy requires multiple that attributes that no single party has, but multiple parties collude to provide.

In accordance with an embodiment, the LAP server on which location verifier 232 executes is configured to store second portion 228. For instance, when an entity encrypts the resource, the entity configures the LAP server to store second portion 234 and specifies the condition(s) required to release second portion 234 (e.g., the location at which the user is required to be).

Key generator 206 is configured to generate (or recover) a decryption key 236 based on first portion 228 and second portion 234. In accordance with an embodiment, key generator 206 combines first portion 228 with second portion 234 to generate decryption key 236. For example, key generator 206 may sum first portion 228 with second portion 234. In another example, key generator 206 may perform a polynomial evaluation with respect to first portion 228 and second portion 234 to generate decryption key 236. It is noted that any number of portions of the decryption key may be released and combined to generate decryption key 236. For example, a portion may be released for each proof that is verified, where a proof is received for each attribute.

In accordance with an embodiment, key generator 206 provides decryption key 236 to decryptor 208, and decryptor 208 decrypts the resource for application 118. In accordance with another embodiment, key generator 206 encrypts decryption key 236 using the public encryption key of an entity (e.g., the user (as stored in identity map 108), the user's device (e.g., computing device 102)), the user's application (e.g., application 118), a document management and storage system (e.g., Microsoft SharePoint™ published by Microsoft® Corp.) that is to decrypt the resource, etc. The public encryption key is retrieved from identity map 108. In accordance with such an embodiment, key generator 206 sends the encrypted decryption key to the entity (e.g., application 118). Decryptor 208 then decrypts the encrypted decryption key using the private encryption key (e.g., private key 210) corresponding to the public encryption key. By doing so, decryption key 236 is protected from rogue users that may intercept communications between LAP server(s) 104 and computing device 102. In accordance with a further embodiment, LAP server(s) 104 comprise a decryptor that decrypts the resource, and LAP server(s) 104 provide the decrypted resource to application 118. This way, application 118 is not required to perform the decryption.

Figure 3:
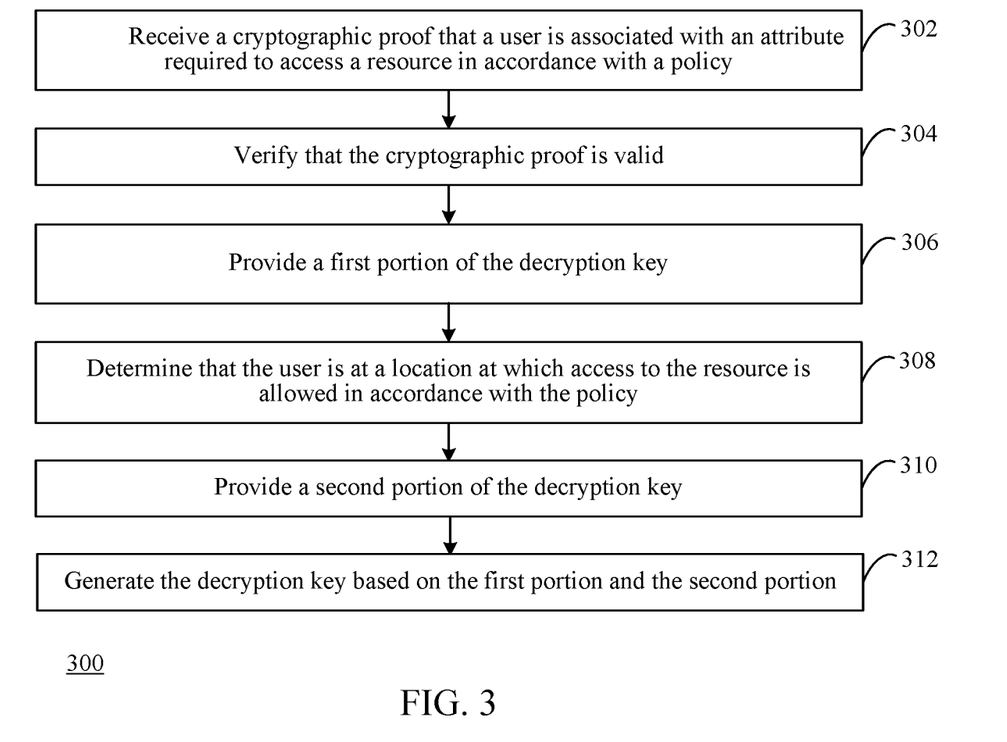
FIG. 3 shows a flowchart for recovering a decryption key in accordance with an example embodiment.
Figure 4:
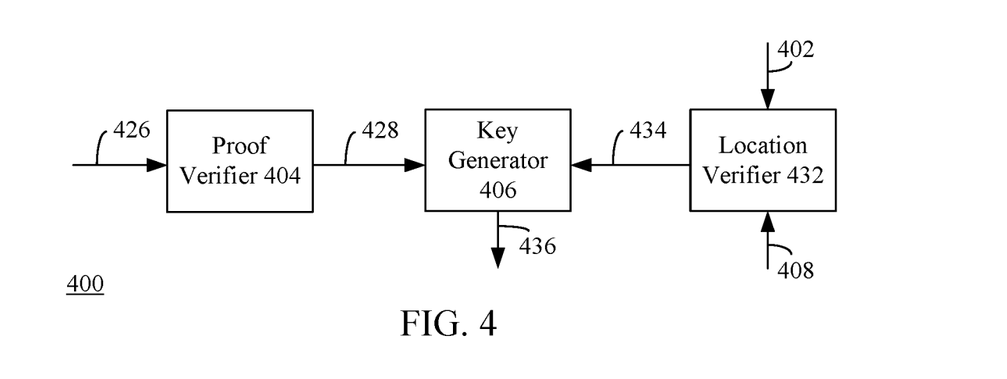
FIG. 4 depicts a block diagram of a system for recovering a decryption key in accordance with a further example embodiment.

Accordingly, a decryption key is recoverable in many ways. For example, FIG. 3 shows a flowchart 300 for recovering a decryption key, according to an example embodiment. In an embodiment, flowchart 300 is implemented by a system 400, as shown in FIG. 4. Accordingly, flowchart 300 will be described with reference to FIG. 4. FIG. 4 depicts a block diagram of a system 400 for recovering a decryption key in accordance with an example embodiment. As shown in FIG. 4, system 400 comprises a proof verifier 404, a key generator 406, and a location verifier 432. Proof verifier 404, key generator 406, and location verifier 432 are examples of proof verifier 204, key generator 206, and location verifier 232, as respectively described above with reference to FIG. 2. In accordance with an embodiment, each of proof verifier 404, key generator 406, and location verifier 432 are implemented in a respective LAP server (e.g., LAP server(s) 104), as described above with reference to FIG. 2. In accordance with another embodiment, one or more of proof verifier 404, key generator 406, and/or location verifier 432 are implemented on the same LAP server. Other structural and operational embodiments will be apparent to persons skilled in the relevant art(s) based on the following discussion regarding flowchart 300 and system 400 of FIG. 4.

Flowchart 300 begins with step 302. In step 302, a cryptographic proof that a user is associated with an attribute required to access a resource in accordance with a policy is received. For example, with reference to FIG. 4, proof verifier 404 receives a cryptographic proof via response 426. Response 426 is an example of response 226, as described above with reference to FIG. 2.

In accordance with one or more embodiments, the attribute comprises at least one of a clearance level of the user, a rank of the user within an organization, or a role of the user within the organization.

In step 304, the cryptographic proof is verified as being valid. For example, with reference to FIG. 4, proof verifier 404 verifies that the cryptographic proof is valid.

In accordance with one or more embodiments, the cryptographic proof is verified based on a public encryption key of the attribute and an encrypted shared secret associated with the attribute. For example, with reference to FIG. 4, proof verifier 404 verifies the cryptographic proof based on a public encryption key of the attribute (e.g., retrieved from attribute map 110, as described above with reference to FIG. 2) and an encrypted shared secret associated with the attribute (e.g., retrieved from attribute map 110, as described above with reference to FIG. 2).

In step 306, responsive to verifying that the cryptographic proof is valid, a first portion of the decryption key is provided. For example, with reference to FIG. 4, responsive to verifying that the cryptographic proof is valid, proof verifier 404 provides a first portion 428 of the decryption key to key generator 406. First portion 428 is an example of first portion 228, as described above with reference to FIG. 2.

In step 308, a determination is made that the user is at a location at which access to the resource is allowed in accordance with the policy. For example, with reference to FIG. 4, location verifier 432 compares location information 402 provided by the application (e.g., application 118, as described above with reference to FIG. 2.) and location information 408 specified by the policy. If the location information matches, then location verifier 432 determines that the user is at a location at which access to the resource is allowed in accordance with the policy.

In step 310, responsive to determining that the user is at the location, a second portion of the decryption key is provided. For example, with reference to FIG. 4, location verifier 432 provides a second portion 434 of the decryption key to key generator 406. Second portion 434 is an example of second portion 234, as described above with reference to FIG. 2.

In step 312, the decryption key is generated based on the first portion and the second portion. For example, with reference to FIG. 4, key generator 406 generates a decryption key 436 based on first portion 428 and second portion 434. Decryption key 436 is an example of decryption key 236, as described above with reference to FIG. 2.

In accordance with one or more embodiments, generating the decryption key comprises combining the first portion with the second portion. For example, with reference to FIG. 4, key generator 406 generates a decryption key 436 by combining first portion 428 and second portion 434.

In accordance with one or more embodiments, combining the first portion and the second portion comprises summing the first portion and the second portion. For example, with reference to FIG. 4, key generator 406 combines first portion 428 and second portion 434 by summing first portion 428 and second portion 434.

Figure 5:
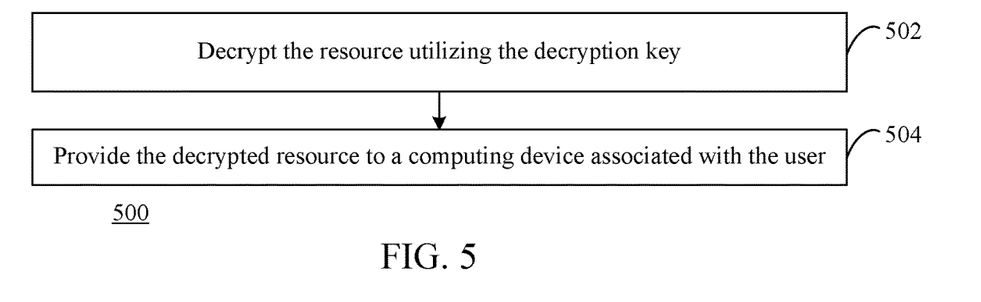
FIG. 5 shows a flowchart for decrypting a resource at a location attribute policy server in accordance with a further example embodiment.
Figure 6:
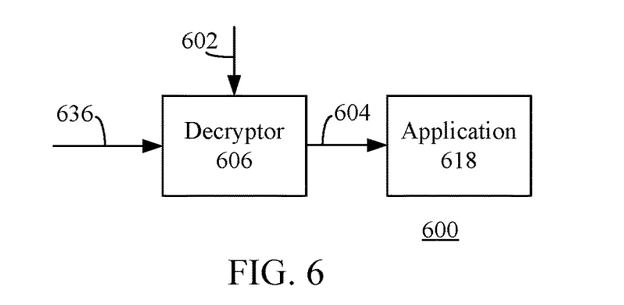
FIG. 6 depicts a block diagram of a system for decrypting a resource at a location attribute policy server in accordance with an example embodiment.

In accordance with one or more embodiments, the resource is decrypted using the decryption key and provided to the requesting application. For example, FIG. 5 shows a flowchart 500 for decrypting a resource at a LAP server, according to an example embodiment. In an embodiment, flowchart 500 is implemented by a system 600, as shown in FIG. 6. Accordingly, flowchart 500 will be described with reference to FIG. 6. FIG. 6 depicts a block diagram of a system 600 for decrypting a resource at a LAP server in accordance with an example embodiment. As shown in FIG. 6, system 600 comprises a decryptor 606 and an application 618. Decryptor 606 is configured to execute on a LAP server (e.g., LAP server(s) 104, as described above with reference to FIG. 2). Application 618 is an example of application 118, as described above with reference to FIG. 1, and is configured to execute on a user's computing device (e.g., computing device 102, as described above with reference to FIG. 1.). Other structural and operational embodiments will be apparent to persons skilled in the relevant art(s) based on the following discussion regarding flowchart 500 and system 600 of FIG. 6.

Flowchart 500 begins with step 502. In step 502, the resource is decrypted utilizing the decryption key. For example, with reference to FIG. 6, decryptor 606 is configured to decrypt the resource (shown as resource 602) using a decryption key 636. Decryption key 636 is an example of decryption key 236, as described above with reference to FIG. 2. In accordance with an embodiment, decryptor 606 is configured to receive resource 602 from application 618. For instance, when retrieving the resource from a data source (e.g., data source, as described above with reference to FIG. 2.), the data source returns the encrypted resource to application 618, and application 618 provides the encrypted resource to LAP server(s) 104 along with the policy ID associated with the resource (e.g., via request 216, as described above with reference to FIG. 2).

In step 504, the encrypted resource is provided to a computing device associated with the user. For example, with reference to FIG. 6, decryptor 606 provides the decrypted resource (shown as decrypted resource 604) to application 618, which executes on a computing device (e.g., computing device 102, as described above with reference to FIG. 2).

Figure 7:
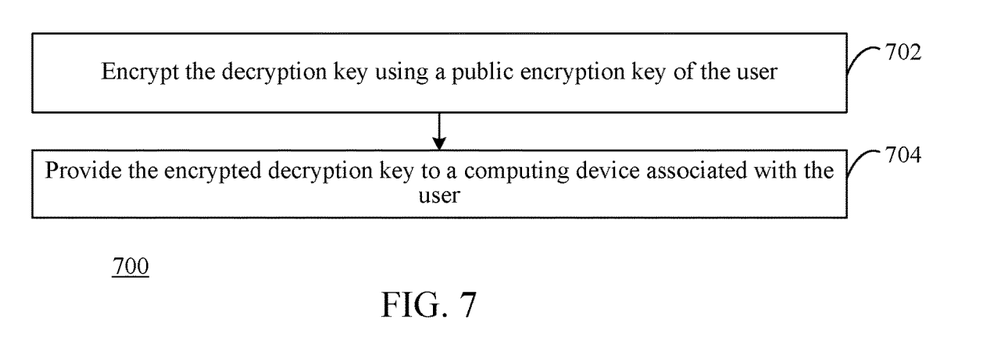
FIG. 7 shows a flowchart for encrypting a decryption key using a public encryption key of the user in accordance with an example embodiment.
Figure 8:
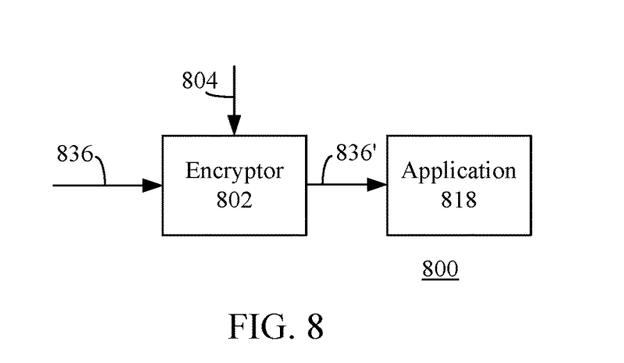
FIG. 8 depicts a block diagram of a system for encrypting a decryption key using a public encryption key of the user in accordance with an example embodiment.

In accordance with one or more embodiments, the decryption key is encrypted with a public encryption key of the user. For example, FIG. 7 shows a flowchart 700 for encrypting a decryption key using a public encryption key of the user in accordance with an example embodiment. In an embodiment, flowchart 700 is implemented by a system 800, as shown in FIG. 8. Accordingly, flowchart 700 will be described with reference to FIG. 8. FIG. 8 depicts a block diagram of a system 800 for encrypting a decryption key using a public encryption key of the user in accordance with an example embodiment. As shown in FIG. 8, system 800 comprises an encryptor 802 and an application 818. Encryptor 802 is configured to execute on a LAP server (e.g., LAP server(s) 104, as described above with reference to FIG. 2). Application 818 is an example of application 118, as described above with reference to FIG. 1, and is configured to execute on a user's computing device (e.g., computing device 102, as described above with reference to FIG. 1.). Other structural and operational embodiments will be apparent to persons skilled in the relevant art(s) based on the following discussion regarding flowchart 700 and system 800 of FIG. 8.

Flowchart 700 begins with step 702. In step 702, the decryption key is encrypted using a public encryption of the user. For example, with reference to FIG. 8, encryptor 802 encrypts a decryption key 836 using a public encryption key 804. Decryption key 826 is an example of decryption key 236, as described above with reference to FIG. 2. Public encryption key is retrievable from an identity map (e.g., identity map 108, as described above with reference to FIG. 1).

In step 704, the encrypted decryption key is provided to a computing device associated with the user. For example, with reference to FIG. 8, encryptor 802 provides the encrypted decryption key (shown as encrypted decryption key 836') to application 818, which executes on a computing device (e.g., computing device 102, as described above with reference to FIG. 2). Application 818 is configured to decrypt encrypted decryption key 836' using a private encryption key (e.g., private key 210, as described above with reference to FIG. 2) corresponding to public encryption key 804.

III. Example Mobile Device and Computer System Implementation

Each of computing device 102, LAP server(s) 104, data source 106, identity map 108, attribute map 110, policy map 112, application 118, proof requester 202, proof verifier 204, key generator 206, location verifier 232, proof generator 224, decryptor 208, proof verifier 404, key generator 406, location verifier 432, decryptor 606, application 618, encryptor 802, and/or application 818, and/or each of the steps of flowcharts 300, 500 and/or 700 may be implemented in hardware, or hardware combined with software and/or firmware. For example, computing device 102, LAP server(s) 104, data source 106, identity map 108, attribute map 110, policy map 112, application 118, proof requester 202, proof verifier 204, key generator 206, location verifier 232, proof generator 224, decryptor 208, proof verifier 404, key generator 406, location verifier 432, decryptor 606, application 618, encryptor 802, and/or application 818 (and/ or any of the components thereof) and/or the steps of flowcharts 300, 500 and/or 700 may be implemented as computer program code (e.g., instructions in a programming language) configured to be executed in one or more processors and stored in a computer readable storage medium. Alternatively, computing device 102, LAP server(s) 104, data source 106, identity map 108, attribute map 110, policy map 112, application 118, proof requester 202, proof verifier 204, key generator 206, location verifier 232, proof generator 224, decryptor 208, proof verifier 404, key generator 406, location verifier 432, decryptor 606, application 618, encryptor 802, and/or application 818 (and/or any of the components thereof) and/or the steps of flowcharts 300, 500 and/or 700 may be implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
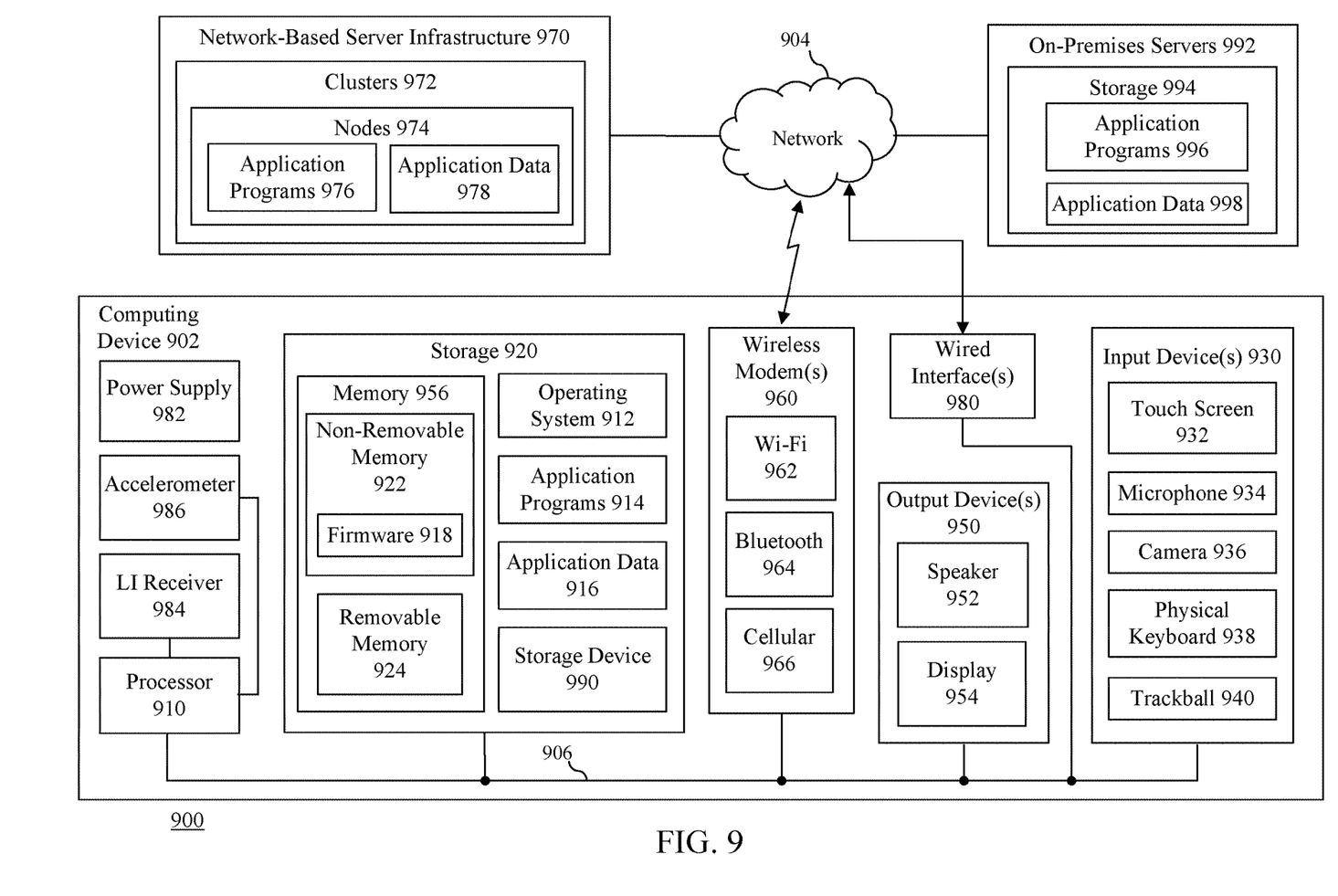
FIG. 9 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 9. FIG. 9 shows a block diagram of an exemplary computing environment 900 that includes a computing device 902, a network-based server infrastructure 970, and an on-premises servers 992. As shown in FIG. 9, computing device 902, network-based server infrastructure 970, and on-premises storage 992 are communicatively coupled via network 904. Network 904 comprises one or more networks such as local area networks (LANs), wide area networks (WANs), enterprise networks, the Internet, etc., and may include one or more wired and/or wireless portions. Network 904 may additional or alternatively include a cellular network for cellular communications.

Embodiments described herein may be implemented in one or more of computing device 902, network-based server infrastructure 970, and on-premises servers 992. For example, in some embodiments, computing device 902 may be used to implement systems, clients, or devices, or components/subcomponents thereof, disclosed elsewhere herein. In other embodiments, a combination of computing device 902, network-based server infrastructure 970, and/or on-premises servers 992 may be used to implement the systems, clients, or devices, or components/subcomponents thereof, disclosed elsewhere herein. Computing device 902, network-based server infrastructure 970, and on-premises storage 992 are described in detail as follows.

Computing device 902 can be any of a variety of types of computing devices. For example, computing device 902 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 902 may alternatively be a stationary computing device such as a desktop computer, a personal computer (PC), a stationary server device, a minicomputer, a mainframe, a supercomputer, etc.

As shown in FIG. 9, computing device 902 includes a variety of hardware and software components, including a processor 910, a storage 920, one or more input devices 930, one or more output devices 950, one or more wireless modems 960, one or more wired interface(s) 980, a power supply 982, a location information (LI) receiver 984, and an accelerometer 986. Storage 920 includes memory 956, which includes non-removable memory 922 and removable memory 924, and a storage device 990. Storage 920 also stores an operating system 912, application programs 914, and application data 916. Wireless modem(s) 960 include a Wi-Fi modem 962, a Bluetooth modem 964, and a cellular modem 966. Output device(s) 950 includes a speaker 952 and a display 954. Input device(s) 930 includes a touch screen 932, a microphone 934, a camera 936, a physical keyboard 938, and a trackball 940. Not all components of computing device 902 shown in FIG. 9 are present in all embodiments, additional components not shown may be present, and any combination of the components may be present in a particular embodiment. These components of computing device 902 are described as follows.

A single processor 910 (e.g., central processing unit (CPU), microcontroller, a microprocessor, signal processor, ASIC (application specific integrated circuit), and/or other physical hardware processor circuit) or multiple processors 910 may be present in computing device 902 for performing such tasks as program execution, signal coding, data processing, input/output processing, power control, and/or other functions. Processor 910 may be a single-core or multi-core processor, and each processor core may be single-threaded or multithreaded (to provide multiple threads of execution concurrently). Processor 910 is configured to execute program code stored in a computer readable medium, such as program code of operating system 912 and application programs 914 stored in storage 920. Operating system 912 controls the allocation and usage of the components of computing device 902 and provides support for one or more application programs 914 (also referred to as "applications" or "apps"). Application programs 914 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 902 can communicate with any other component according to function, although not all connections are shown for ease of illustration. For instance, as shown in FIG. 9, bus 906 is a multiple signal line communication medium (e.g., conductive traces in silicon, metal traces along a motherboard, wires, etc.) that may be present to communicatively couple processor 910 to various other components of computing device 902, although in other embodiments, an alternative bus, further busses, and/or one or more individual signal lines may be present to communicatively couple components. Bus 906 represents one or more of any of several types of bus structures, including a memory bus or memory controller, a peripheral bus, an accelerated graphics port, and a processor or local bus using any of a variety of bus architectures.

Storage 920 is physical storage that includes one or both of memory 956 and storage device 990, which store operating system 912, application programs 914, and application data 916 according to any distribution. Non-removable memory 922 includes one or more of RAM (random access memory), ROM (read only memory), flash memory, a hard disk (e.g., a magnetic disk drive for reading from and writing to a hard disk), and/or other physical memory device type. Non-removable memory 922 may include main memory and may be separate from or fabricated in a same integrated circuit as processor 910. As shown in FIG. 9, non-removable memory 922 stores firmware 918, which may be present to provide low-level control of hardware. Examples of firmware 918 include BIOS (Basic Input/Output System, such as on personal computers) and boot firmware (e.g., on smart phones). Removable memory 924 may be inserted into a receptacle of or otherwise coupled to computing device 902 and can be removed by a user from computing device 902. Removable memory 924 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 990 may be present that are internal and/or external to a housing of computing device 902 and may or may not be removable. Examples of storage device 990 include a hard disk drive, a solid-state drive (SSD), a thumb drive (e.g., a USB (Universal Serial Bus) flash drive), or other physical storage device.

One or more programs may be stored in storage 920. Such programs include operating system 912, one or more application programs 914, and other program modules and program data. Examples of such application programs may include, for example, computer program logic (e.g., computer program code/instructions) for implementing one or more of, LAP server(s) 104, data source 106, identity map 108, attribute map 110, policy map 112, application 118, proof requester 202, proof verifier 204, key generator 206, location verifier 232, proof generator 224, decryptor 208, proof verifier 404, key generator 406, location verifier 432, decryptor 606, application 618, encryptor 802, and/or application 818, along with any components and/or subcomponents thereof, as well as the flowcharts/flow diagrams (e.g., flowcharts 300, 500, and/or 700) described herein, including portions thereof, and/or further examples described herein.

Storage 920 also stores data used and/or generated by operating system 912 and application programs 914 as application data 916. Examples of application data 916 include web pages, text, images, tables, sound files, video data, and other data, which may also be sent to and/or received from one or more network servers or other devices via one or more wired or wireless networks. Storage 920 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 902 through one or more input devices 930 and may receive information from computing device 902 through one or more output devices 950. Input device(s) 930 may include one or more of touch screen 932, microphone 934, camera 936, physical keyboard 938 and/or trackball 940 and output device(s) 950 may include one or more of speaker 952 and display 954. Each of input device(s) 930 and output device(s) 950 may be integral to computing device 902 (e.g., built into a housing of computing device 902) or external to computing device 902 (e.g., communicatively coupled wired or wirelessly to computing device 902 via wired interface(s) 980 and/or wireless modem(s) 960). Further input devices 930 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 954 may display information, as well as operating as touch screen 932 by receiving user commands and/or other information (e.g., by touch, finger gestures, virtual keyboard, etc.) as a user interface. Any number of each type of input device(s) 930 and output device(s) 950 may be present, including multiple microphones 934, multiple cameras 936, multiple speakers 952, and/or multiple displays 954.

One or more wireless modems 960 can be coupled to antenna(s) (not shown) of computing device 902 and can support two-way communications between processor 910 and devices external to computing device 902 through network 904, as would be understood to persons skilled in the relevant art(s). Wireless modem 960 is shown generically and can include a cellular modem 966 for communicating with one or more cellular networks, such as a GSM network for data and voice communications within a single cellular network, between cellular networks, or between the mobile device and a public switched telephone network (PSTN). Wireless modem 960 may also or alternatively include other radio-based modem types, such as a Bluetooth modem 964 (also referred to as a "Bluetooth device") and/or Wi-Fi 962 modem (also referred to as an "wireless adaptor"). Wi-Fi modem 962 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 902 can further include power supply 982, LI receiver 984, accelerometer 986, and/or one or more wired interfaces 980. Example wired interfaces 980 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 980 of computing device 902 provide for wired connections between computing device 902 and network 904, or between computing device 902 and one or more devices/peripherals when such devices/peripherals are external to computing device 902 (e.g., a pointing device, display 954, speaker 952, camera 936, physical keyboard 938, etc.). Power supply 982 is configured to supply power to each of the components of computing device 902 and may receive power from a battery internal to computing device 902, and/or from a power cord plugged into a power port of computing device 902 (e.g., a USB port, an A/C power port). LI receiver 984 may be used for location determination of computing device 902 and may include a satellite navigation receiver such as a Global Positioning System (GPS) receiver or may include other type of location determiner configured to determine location of computing device 902 based on received information (e.g., using cell tower triangulation, etc.). Accelerometer 986 may be present to determine an orientation of computing device 902.

Note that the illustrated components of computing device 902 are not required or all-inclusive, and fewer or greater numbers of components may be present as would be recognized by one skilled in the art. For example, computing device 902 may also include one or more of a gyroscope, barometer, proximity sensor, ambient light sensor, digital compass, etc. Processor 910 and memory 956 may be co-located in a same semiconductor device package, such as being included together in an integrated circuit chip, FPGA, or system-on-chip (SOC), optionally along with further components of computing device 902.

In embodiments, computing device 902 is configured to implement any of the above-described features of flowcharts herein. Computer program logic for performing any of the operations, steps, and/or functions described herein may be stored in storage 920 and executed by processor 910.

In some embodiments, server infrastructure 970 may be present. Server infrastructure 970 may be a network-accessible server set (e.g., a cloud-based environment or platform). As shown in FIG. 9, server infrastructure 970 includes clusters 972. Each of clusters 972 may comprise a group of one or more compute nodes and/or a group of one or more storage nodes. For example, as shown in FIG. 9, cluster 972 includes nodes 974. Each of nodes 974 are accessible via network 904 (e.g., in a "cloud-based" embodiment) to build, deploy, and manage applications and services. Any of nodes 974 may be a storage node that comprises a plurality of physical storage disks, SSDs, and/or other physical storage devices that are accessible via network 904 and are configured to store data associated with the applications and services managed by nodes 974. For example, as shown in FIG. 9, nodes 974 may store application data 978.

Each of nodes 974 may, as a compute node, comprise one or more server computers, server systems, and/or computing devices. For instance, a node 974 may include one or more of the components of computing device 902 disclosed herein. Each of nodes 974 may be configured to execute one or more software applications (or "applications") and/or services and/or manage hardware resources (e.g., processors, memory, etc.), which may be utilized by users (e.g., customers) of the network-accessible server set. For example, as shown in FIG. 9, nodes 974 may operate application programs 976. In an implementation, a node of nodes 974 may operate or comprise one or more virtual machines, with each virtual machine emulating a system architecture (e.g., an operating system), in an isolated manner, upon which applications such as application programs 976 may be executed.

In an embodiment, one or more of clusters 972 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 972 may be a datacenter in a distributed collection of datacenters. In embodiments, exemplary computing environment 900 comprises part of a cloud-based platform such as Amazon Web Services® of Amazon Web Services, Inc. or Google Cloud Platform™ of Google LLC, although these are only examples and are not intended to be limiting.

In an embodiment, computing device 902 may access application programs 976 for execution in any manner, such as by a client application and/or a browser at computing device 902. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 902 may additionally and/or alternatively synchronize copies of application programs 914 and/or application data 916 to be stored at network-based server infrastructure 970 as application programs 976 and/or application data 978. For instance, operating system 912 and/or application programs 914 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 920 at network-based server infrastructure 970.

In some embodiments, on-premises servers 992 may be present. On-premises servers 992 are hosted within an organization's infrastructure and, in many cases, physically onsite of a facility of that organization. On-premises servers 992 are controlled, administered, and maintained by IT (Information Technology) personnel of the organization or an IT partner to the organization. Application data 998 may be shared by on-premises servers 992 between computing devices of the organization, including computing device 902 (when part of an organization) through a local network of the organization, and/or through further networks accessible to the organization (including the Internet). Furthermore, on-premises servers 992 may serve applications such as application programs 996 to the computing devices of the organization, including computing device 902. Accordingly, on-premises servers 992 may include storage 994 (which includes one or more physical storage devices such as storage disks and/or SSDs) for storage of application programs 996 and application data 998 and may include one or more processors for execution of application programs 996. Still further, computing device 902 may be configured to synchronize copies of application programs 914 and/or application data 916 for backup storage at on-premises servers 992 as application programs 996 and/or application data 998.

As used herein, the terms "computer program medium," "computer-readable medium," and "computer-readable storage medium," etc., are used to refer to physical hardware media. Examples of such physical hardware media include any hard disk, magnetic disk, optical disk, other physical hardware media such as RAMs, ROMs, flash memory, digital video disks, zip disks, MEMs (microelectronic machine) memory, nanotechnology-based storage devices, and further types of physical/tangible hardware storage media of storage 920. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 914) may be stored in storage 920. Such computer programs may also be received via wired interface(s) 980 and/or wireless modem(s) 960 over network 904. Such computer programs, when executed or loaded by an application, enable computing device 902 to implement features of embodiments discussed herein. Accordingly, such computer programs represent controllers of the computing device 902.

Embodiments are also directed to computer program products comprising computer code or instructions stored on any computer-readable medium or computer-readable storage medium. Such computer program products include the physical storage of storage 920 as well as further physical storage types.

IV. Additional Example Embodiments

A system is described herein. The system includes at least one processor; and at least one memory that stores program code that, when executed by the at least one processor, performs operations to recover a decryption key. The operations comprise: receiving a cryptographic proof that a user is associated with an attribute required to access a resource in accordance with a policy; verifying that the cryptographic proof is valid; responsive to verifying that the cryptographic proof is valid, providing a first portion of the decryption key; determining that the user is at a location at which access to the resource is allowed in accordance with the policy; responsive to determining that the user is at the location, providing a second portion of the decryption key; and generating the decryption key based on the first portion and the second portion.

In one implementation of the foregoing system, the attribute comprises at least one of: a clearance level of the user; a rank of the user within an organization; or a role of the user within the organization.

In one implementation of the foregoing system, the operations further comprising: encrypting the decryption key using a public encryption key of the user; and providing the encrypted decryption key to a computing device associated with the user.

In one implementation of the foregoing system, said generating comprises: combining the first portion with the second portion.

In one implementation of the foregoing system, said combining comprises: summing the first portion and the second portion.

In one implementation of the foregoing system, the operations further comprising: decrypting the resource utilizing the decryption key; and providing the decrypted resource to a computing device associated with the user.

In one implementation of the foregoing system, the cryptographic proof is verified based on a public encryption key associated with the attribute and an encrypted shared secret associated with the attribute.

A method for recovering a decryption key is also disclosed herein. The method includes: receiving a cryptographic proof that a user is associated with an attribute required to access a resource in accordance with a policy; verifying that the cryptographic proof is valid; responsive to verifying that the cryptographic proof is valid, providing a first portion of the decryption key; determining that the user is at a location at which access to the resource is allowed in accordance with the policy; responsive to determining that the user is at the location, providing a second portion of the decryption key; and generating the decryption key based on the first portion and the second portion.

In one implementation of the foregoing method, the attribute comprises at least one of: a clearance level of the user; a rank of the user within an organization; or a role of the user within the organization.

In one implementation of the foregoing method, the method further comprises: encrypting the decryption key using a public encryption key of the user; and providing the encrypted decryption key to a computing device associated with the user.

In one implementation of the foregoing method, said generating comprises: combining the first portion with the second portion.

In one implementation of the foregoing method, said combining comprises: summing the first portion and the second portion.

In one implementation of the foregoing method, the method further comprises: decrypting the resource utilizing the decryption key; and providing the decrypted resource to a computing device associated with the user.

In one implementation of the foregoing method, the cryptographic proof is verified based on a public encryption key associated with the attribute and an encrypted shared secret associated with the attribute.

A computer-readable storage medium having program instructions recorded thereon that, when executed by at least one processor, perform a method for recovering a decryption key is further described herein. The method includes: receiving a cryptographic proof that a user is associated with an attribute required to access a resource in accordance with a policy; verifying that the cryptographic proof is valid; responsive to verifying that the cryptographic proof is valid, providing a first portion of the decryption key; determining that the user is at a location at which access to the resource is allowed in accordance with the policy; responsive to determining that the user is at the location, providing a second portion of the decryption key; and generating the decryption key based on the first portion and the second portion.

In one implementation of the foregoing computer-readable storage medium, the attribute comprises at least one of: a clearance level of the user; a rank of the user within an organization; or a role of the user within the organization.

In one implementation of the foregoing computer-readable storage medium, the method further comprises: encrypting the decryption key using a public encryption key of the user; and providing the encrypted decryption key to a computing device associated with the user.

In one implementation of the foregoing computer-readable storage medium, said generating comprises: combining the first portion with the second portion.

In one implementation of the foregoing computer-readable storage medium, said combining comprises: summing the first portion and the second portion.

In one implementation of the foregoing computer-readable storage medium, the method further comprises: decrypting the resource utilizing the decryption key; and providing the decrypted resource to a computing device associated with the user.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
   a processor; and
   a memory that stores program code that, when executed by the processor, performs operations to recover a decryption key, the operations comprising:
   receiving a cryptographic proof that a user is associated with an attribute required to access a resource in accordance with a policy;
   verifying that the cryptographic proof is valid using a zero-knowledge proof;
   responsive to verifying that the cryptographic proof is valid, providing a first portion of the decryption key;
   determining that the user is at a location at which access to the resource is allowed in accordance with the policy;
   responsive to determining that the user is at the location, providing a second portion of the decryption key; and
   combining the first portion and the second portion to generate the decryption key.

2. The system of claim 1, wherein the attribute comprises at least one of:
   a clearance level of the user;
   a rank of the user within an organization; or
   a role of the user within the organization.

3. The system of claim 1, the operations further comprising:
   encrypting the decryption key using a public encryption key of the user; and
   providing the encrypted decryption key to a computing device associated with the user.

4. The system of claim 1, wherein said combining comprises:
   summing the first portion and the second portion.

5. The system of claim 1, the operations further comprising:
   decrypting the resource utilizing the decryption key; and
   providing the decrypted resource to a computing device associated with the user.

6. The system of claim 1, wherein the cryptographic proof is verified based on a public encryption key associated with the attribute and an encrypted shared secret associated with the attribute.

7. The system of claim 1, the operations further comprising:
   receiving a request to access the resource, the request specifying a policy identifier of the policy; and
   obtaining the policy corresponding to the policy identifier.

8. A method for recovering a decryption key, comprising:
   receiving a cryptographic proof that a user is associated with an attribute required to access a resource in accordance with a policy;
   verifying that the cryptographic proof is valid using a zero-knowledge proof;
   responsive to verifying that the cryptographic proof is valid, providing a first portion of the decryption key;
   determining that the user is at a location at which access to the resource is allowed in accordance with the policy;
   responsive to determining that the user is at the location, providing a second portion of the decryption key; and
   combining the first portion and the second portion to generate the decryption key.

9. The method of claim 8, wherein the attribute comprises at least one of:
   a clearance level of the user;
   a rank of the user within an organization; or
   a role of the user within the organization.

10. The method of claim 8, further comprising:
    encrypting the decryption key using a public encryption key of the user; and
    providing the encrypted decryption key to a computing device associated with the user.

11. The method of claim 8, wherein said combining comprises:
    summing the first portion and the second portion.

12. The method of claim 8, further comprising:
    decrypting the resource utilizing the decryption key; and
    providing the decrypted resource to a computing device associated with the user.

13. The method of claim 8, wherein the cryptographic proof is verified based on a public encryption key associated with the attribute and an encrypted shared secret associated with the attribute.

14. The method of claim 8, further comprising:
    receiving a request to access the resource, the request specifying a policy identifier of the policy; and
    obtaining the policy corresponding to the policy identifier.

15. A computer-readable storage medium having program instructions recorded thereon that, when executed by a processor, perform a method for recovering a decryption key comprising:
    receiving a cryptographic proof that a user is associated with an attribute required to access a resource in accordance with a policy;
    verifying that the cryptographic proof is valid using a zero-knowledge proof;
    responsive to verifying that the cryptographic proof is valid, providing a first portion of the decryption key;
    determining that the user is at a location at which access to the resource is allowed in accordance with the policy;
    responsive to determining that the user is at the location, providing a second portion of the decryption key; and
    combining the first portion and the second portion to generate the decryption key.

16. The computer-readable storage medium of claim 15, wherein the attribute comprises at least one of:
    a clearance level of the user;
    a rank of the user within an organization; or
    a role of the user within the organization.

17. The computer-readable storage medium of claim 15, the method further comprising:
    encrypting the decryption key using a public encryption key of the user; and
    providing the encrypted decryption key to a computing device associated with the user.

18. The computer-readable storage medium of claim 15, wherein said combining comprises:
    summing the first portion and the second portion.

19. The computer-readable storage medium of claim 15, the method further comprising:
    decrypting the resource utilizing the decryption key; and
    providing the decrypted resource to a computing device associated with the user.

20. The computer-readable storage medium of claim 15, the method further comprising:
    receiving a request to access the resource, the request specifying a policy identifier of the policy; and
    obtaining the policy corresponding to the policy identifier.

* * * * *